Oct. 13, 1931.   G. BORDEN 2D., ET AL   1,827,185
CONTROL APPARATUS
Filed June 7, 1930   4 Sheets-Sheet 1

INVENTORS
Gail Borden
Eric Carlton
BY
Janney Blair Curtis
their ATTORNEYS

Oct. 13, 1931.  G. BORDEN 2D., ET AL  1,827,185
CONTROL APPARATUS
Filed June 7, 1930   4 Sheets-Sheet 2

INVENTORS
Gail Borden 2nd
Eric Carlton
BY
Janney Blair & Curtis
their ATTORNEYS

Oct. 13, 1931.    G. BORDEN 2D., ET AL    1,827,185

CONTROL APPARATUS

Filed June 7, 1930    4 Sheets-Sheet 3

INVENTORS
Gail Borden 2nd
Eric Carlton
BY
Janney Blair & Curtis
their ATTORNEYS

Oct. 13, 1931.  G. BORDEN 2D., ET AL  1,827,185
CONTROL APPARATUS
Filed June 7, 1930  4 Sheets-Sheet 4
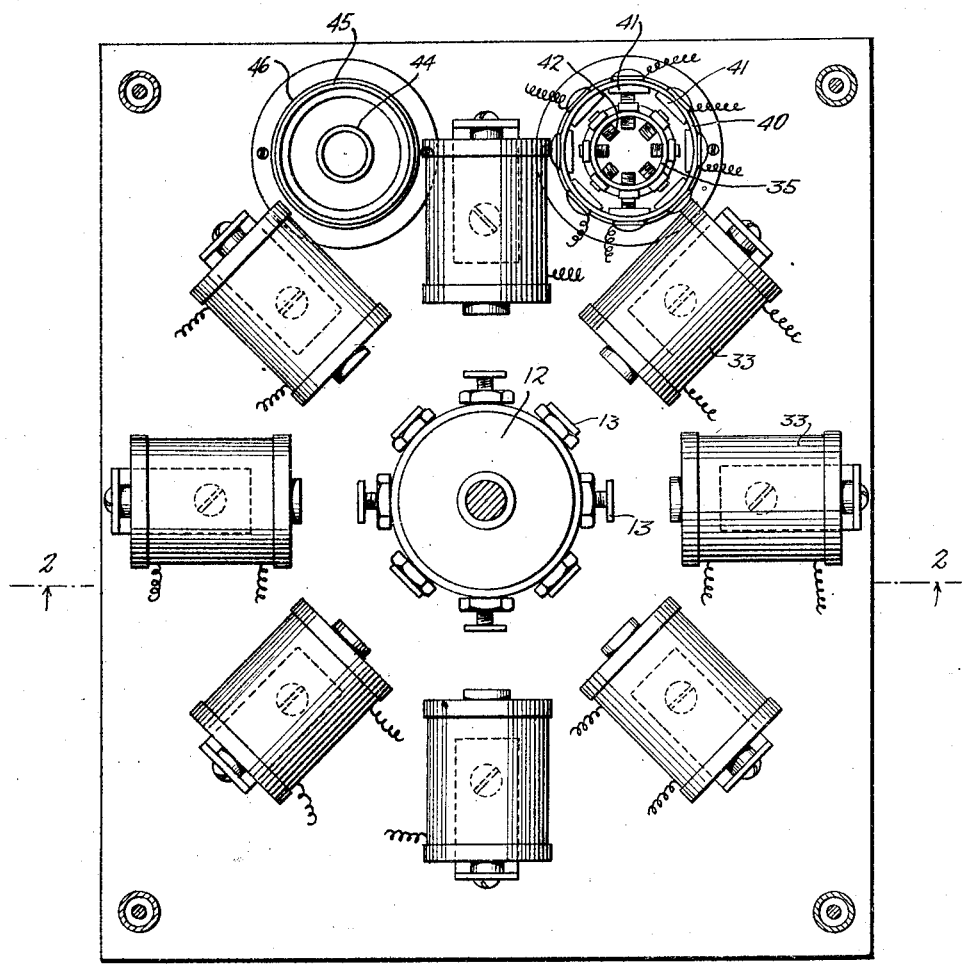
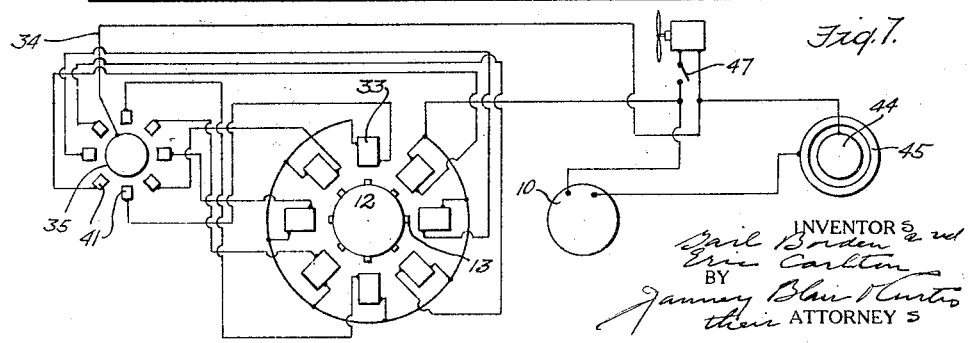

Patented Oct. 13, 1931

1,827,185

UNITED STATES PATENT OFFICE

GAIL BORDEN, 2D, AND ERIC CARLTON, OF NEW YORK, N. Y.

CONTROL APPARATUS

Application filed June 7, 1930. Serial No. 459,620.

The present invention relates to improvements in automatic airplane control mechanism. One object thereof has been to provide a relatively simple apparatus which may conveniently be incorporated in airplanes of various types and which automatically operates to maintain the same in a predetermined attitude or direction of flight. One objection to previously known stabilizing devices for airplanes has been their excessive weight in relation to the weight of the plane. This has been true more particularly of control apparatus including two or more actuating motors and of devices operating on the gyroscopic principle. A further objection to the latter type of control device is that it interferes with hand control.

Figure 1:
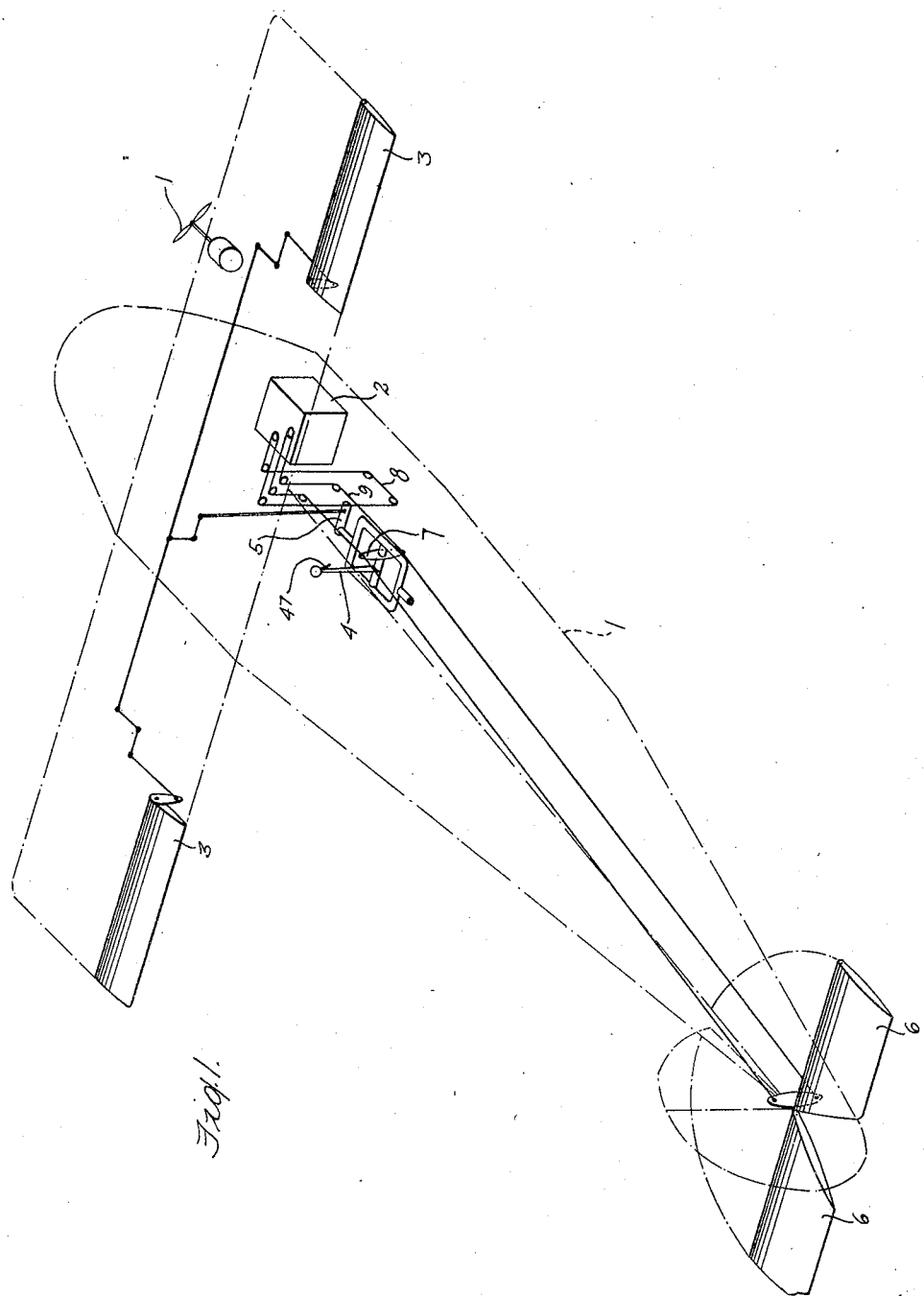
Figure 2:
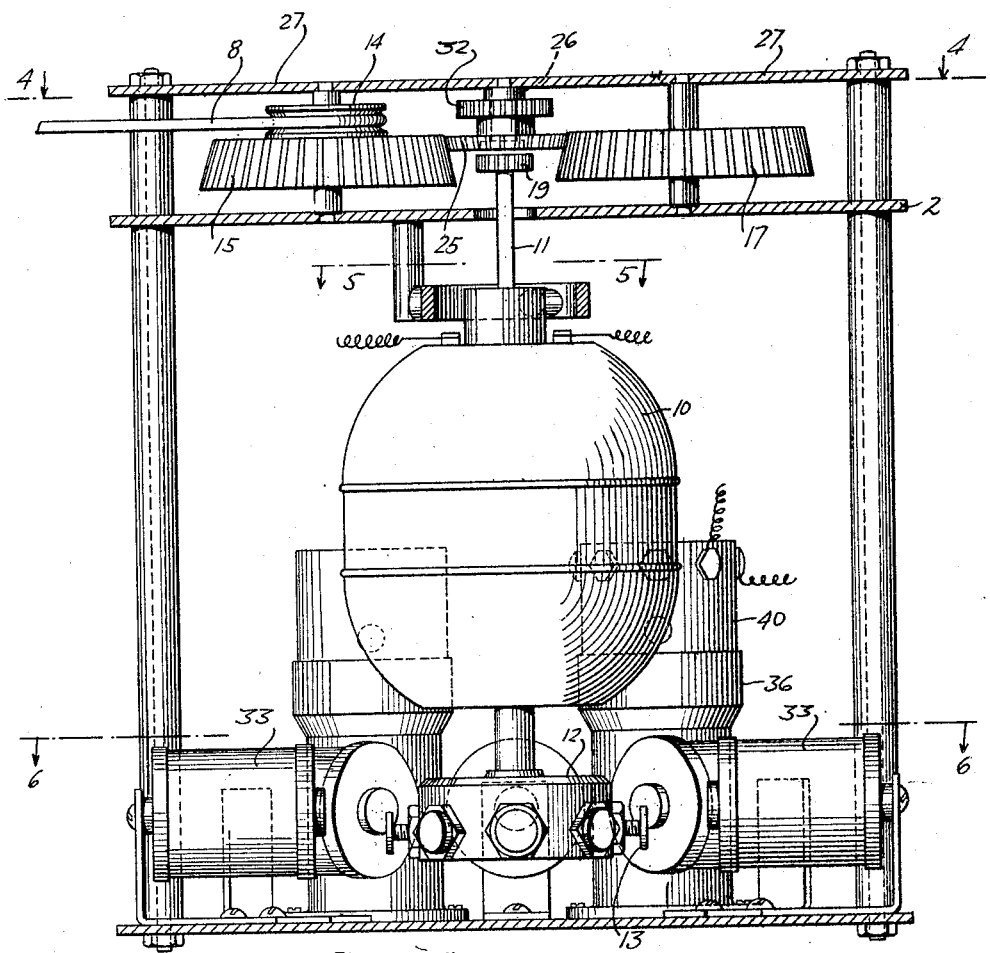
Figure 3:
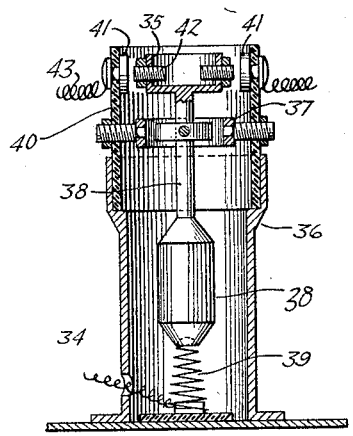
Figure 4:
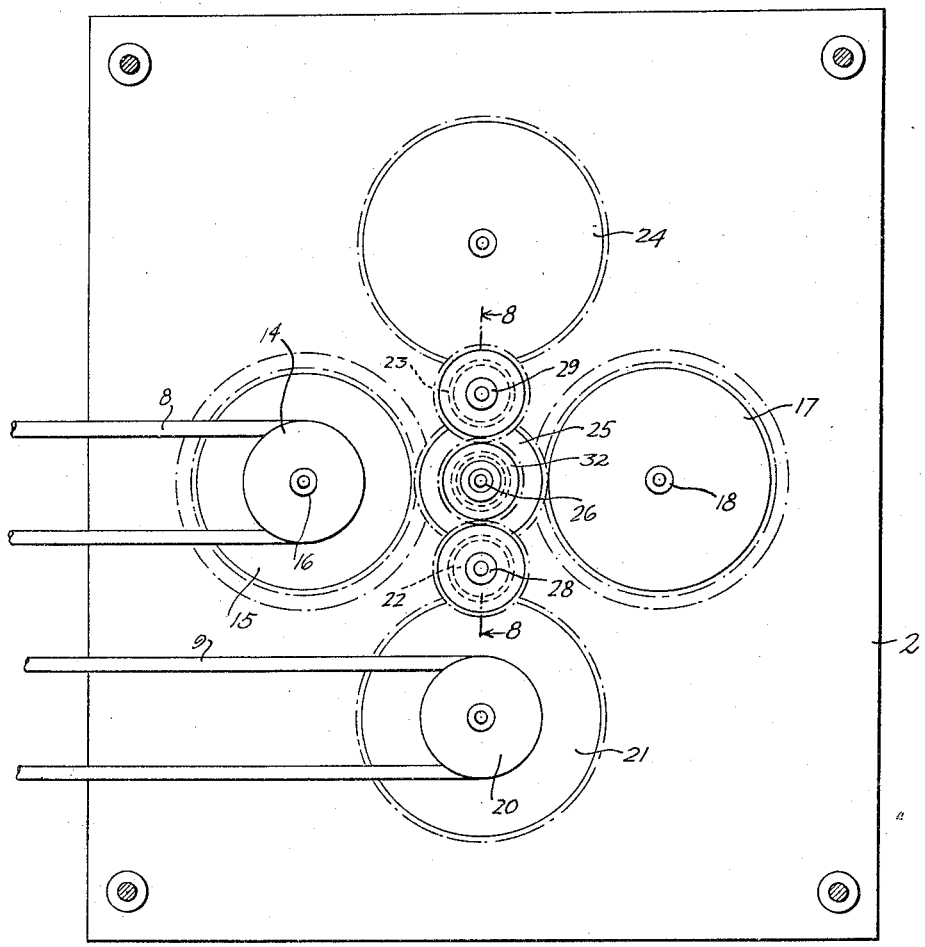
Figure 5:
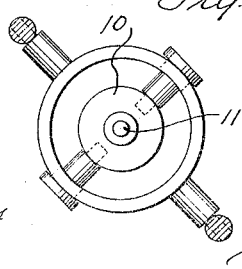

Accordingly, a further object of our invention 15 has been to provide a stabilizing or control mechanism capable of being embodied in a compact and relatively light structure and which, when not operating as an automatic controlling device, remains inert and offers no impediment to the free and normal manual operation of the airplane controls. Further advantages of our invention will be apparent from the following description of one form thereof taken in connection with the appended drawings in which, Figure 1 is a diagrammatic view in perspective of one embodiment of our automatic stabilizer operatively connected to the ailerons and elevators respectively of an airplane;

Figure 2, a view of the control device with portions shown in transverse vertical section;

Figure 3, a central longitudinal section of one form of pendulum switch for use in connection with the electro-magnet circuit;

Figure 4, a horizontal section on line 4—4 of Figure 2;

Figure 5, a horizontal section on the line 5—5 of Figure 2;

Figure 6, a horizontal section on the line 6—6 of Figure 2;

Figure 7, a wiring diagram; and

Figure 8:
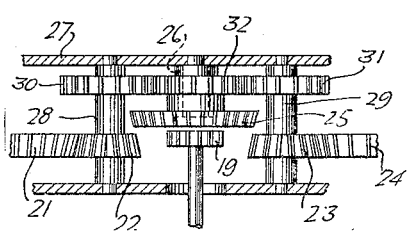

Figure 8, a fragmentary view in vertical section on the line 8—8 of Figure 4.

Referring to the drawings, an automatic control unit 2, portions of which are connected operatively with portions of the usual airplane control mechanism, is mounted in the body 1 of an airplane. For example, the ailerons 3 are normally actuated by suitable means from the control stick or lever 4 and a crank arm 5 connected thereto. The elevators 6 are also actuated by the control lever or stick 4 through a double crank 7. In the illustrated embodiment, the ailerons are connected to our improved automatic control unit by means of a rope or cord 8 while the elevators are connected with said unit by means of a similar rope or cord 9.

Referring now to Figure 2, the unit 2 comprises a suitable frame or housing within which is pendularly mounted a motor 10 having a shaft 11 and a depending armature member 12, preferably in the form of a ring or disc of magnetizable material as steel or iron and upon which are mounted adjustment screws 13 of similar material.

Suitable means are provided for automatically connecting and disconnecting the motor and its shaft 11 with devices for controlling the direction of movement of the cords or ropes 8 and 9. For this purpose, as indicated in Figure 4, the rope 8 for actuating the ailerons is operatively connected with a drum 14 secured to a bevel gear 15 mounted on a stud shaft 16. A similar bevel gear 17 is mounted on a stud shaft 18. A pinion 19 is mounted on the motor shaft 11 of the motor 10, said pinion being positioned and adapted to engage the gear 15 when the axis of the motor 10 and its shaft 11 is inclined in one direction and to engage the bevel gear 17 when said axis is inclined in the opposite direction.

The elevator actuating rope or cord 9 engages a drum 20 secured to a pinion 21 which in turn is driven by a bevel gear 22. Another bevel gear 23 engages and actuates a pinion 24, the bevel gears 22 and 23 being so related to the pinion 19 that, when the motor axis is in one angular position, pinion 19 engages bevel gear 22 and when said axis is in the opposite angular position, said pinion 19 engages bevel gear 23. It is contemplated also that if the axis of the motor and its shaft 11 inclines to a position between any two of the positions hereinabove referred to, then both of the cords 8 and 9 will be actuated simultaneously.

In order that rope 8 may be actuated by drum 14 when the pinion 19 engages bevel gear 17, the latter is operatively connected to bevel gear 15 by means of an idler 25 mounted on a spindle 26, Figure 2, supported on a crosspiece 27 of the main frame of the control unit. The bevel gears 22 and 23 respectively are mounted on stud shafts 28 and 29 respectively, which rotate with said gears and carry gears 30 and 31, positioned to engage an idler 32 mounted on spindle 26. Thus, the drum 14 and consequently the rope 8 will be actuated when the pinion 19 engages either the bevel gear 15 or the bevel gear 17. Likewise, the drum 20 and the rope 9 will be actuated when the pinion 19 engages either the gear 22 or gear 23. It will be understood that with this form of device, the ropes 8 and 9 may conveniently engage the drums 14 and 20 respectively with one or more turns, so that, during any position or direction correcting operation, there will be no unnecessary or undesirable slack in said rope.

As indicated in Figures 2 and 5, the motor 10 is supported by a universal joint suspension depending from an upper portion of the unit housing. As the airplane tilts to the left or to the right, the motor swings accordingly, and as the airplane tilts up or down, the motor swings rearwardly or forwardly and engages the proper control rope actuating mechanisms above described. To retain the pinion 19 in effective driving relation to one of the gears when the motor is tilted to a predetermined extent or angle out of the normal, we provide means for releasably holding the motor in gear driving position without a positive mechanical connection until the airplane shall again right itself or change its position in such a way as to again change the angle of the motor axis. One convenient arrangement for this purpose includes a plurality of electromagnets 33, Figure 6, arranged with their cores in position to engage the adjustment screws 13. As indicated in Figure 7, the coil of each electromagnet 33 is in circuit with a suitable source of electrical energy, as for example the magneto of the airplane engine or a storage battery. The magnet circuits include a ground wire connecting with an annular terminal 35.

As indicated more clearly in Figure 3, the individual circuits of the magnets 33 are selectively closed by means of a switch which includes a housing or support 36 in which is mounted a universal suspension 37 supporting a pendulum 38, at the upper end of which the aforesaid annular contact member or terminal 35 is mounted. A coiled spring 39 engages the lower end of pendulum 38 and serves to steady or damp the same to prevent or limit unnecessary vibrations thereof. The housing 36 supports an insulating collar 40 upon which are mounted the electrically separated terminals 41, each located opposite a contact or terminal 42, preferably threaded so as to be readily adjustable in relation to its corresponding terminal 41. In each case, a lead 43 connects terminal 41 with the coil of one of the magnets 33.

In operation, the switch mechanism hereinabove described energizes the magnets 33 in accordance with the direction of deviation, dip or inclination of the airplane and in such a way that the proper magnet or magnets may be energized to hold the armature 12 and consequently to retain the driving pinion 19 in proper position for driving or actuating the control devices.

However, it is contemplated that the motor will preferably not be actuated until the pinion 19 shall have meshed with one of the gears hereinabove described. For this purpose, a second direction or inclination controlled switch is provided. As indicated in Figure 6, an annular terminal 44 is mounted at the upper end of a pendulum suspended from an intermediate portion of its shank by means of a universal suspension such as 37 in Figure 3. The other terminal 45 of this switch is mounted on the inner side of a side of a cylindrical casing 46 which supports the terminal 44 and pendulum hereinabove referred to, the parts being so arranged that after the air plane has deviated from a normal horizontal flying position to an inclined position of a predetermined magnitude, the terminal 44 will operatively engage the terminal 45 to close the motor circuit. The parts are also arranged and positioned in such a way that effective engagement between said terminals 44 and 45 cannot take place until after the pinion 19 has met with one of the control rope actuating gears as above described. In other words, the terminal 44 will swing through a wider angle to reach terminal 45 than the angle through which the shaft 11 moves to bring pinion 19 into operative engagement with one of the gears 15, 22, 17, or 23, respectively.

It will of course be desirable to arrange the automatic control mechanism in such a way that the airplane operator may readily place it in operation or throw it out of operation at will. Accordingly, the electrical circuit through which the magnets are energized and the motor 10 is driven is provided with a main switch 47. This is most conveniently positioned on the control lever or stick 4 in such a way that, when the operator has his hand on the stick, the switch is open. However, as soon as he removes his hand from the stick, the switch automatically closes and the automatic control mechanism is then ready to operate as contemplated in case the airplane shall deviate from its course by inclination on a longitudinal or transverse axis or a combination thereof.

When switch 47 is closed as above indicated, and if the suggested change of course takes place, the whole housing or unit inclines with the plane, thereby bringing one or more of the rope actuating gears into operative relation with the pinion 19. The switch including terminals 44 and 45 is so timed in relation to the switch including the terminals 41 and 42 that the latter terminals will engage before engagement takes place between terminals 44 and 45. Thus, when the motor actuating circuit is closed, the pinion 19 is in position to drive one of the rope actuating gears and the parts are being held in operative relation by the proper magnet 33. As soon as the machine rights itself to a predetermined extent, the motor actuating circuit is opened and, as the position of normal flight is further approached, the magnet energizing circuit or circuits are opened so that, when normal flight on a horizontal plane is reestablished, the parts will be in position to engage in a different arrangement upon the occurrence of an inclination in a different direction.

From the foregoing description and from the stated mode of operation of our automatic control mechanism, it will be apparent that our invention provides a universal stabilizer encompassed within a single operative unit as distinguished from prior devices in which two separate units have been required to provide the flight adjusting mechanism. Furthermore, there is no inertia except such small amount as may be inherent in the relatively small mass of the device, as compared to gyroscopic stabilizers which present problems of steering and controlling in addition to problems of weight distribution not easily solved in economical and efficient airplane construction. It is contemplated that a device such as we have described or its equivalent will preferably be located at or in the vicinity of the center of gravity of the airplane so that the tilting movement of the control parts will bear a proper relation to the tilting of the airplane as a whole.

We claim as our invention:

1. Control apparatus comprising a pendularly supported motor, a plurality of driven members, means interposed between said motor and said members to operatively connect the motor with said driven members at predetermined positions of the motor, and means for starting said motor after the same has been operatively connected with a driven member.

2. Control apparatus comprising a plurality of driven members, a driving member pendularly mounted to engage one of said driven members, a plurality of electro magnets in operative relation to said driven members and adapted to releasably retain said driving member and one of said driven members in operative relation, means for energizing said magnets, a motor mounted to move with and to actuate said driving member, and a switch in the motor circuit adapted to close said circuit after the driving member and a driven member are in operative driving relation.

3. Control apparatus comprising a plurality of driven members, a driving member pendularly mounted to engage one of said driven members, a plurality of electro magnets positioned and adapted to releasably retain said driving member in engagement with one of said driven members, means for energizing said magnets, and a motor mounted to move with and to actuate said driving member.

4. Automatic control apparatus for airplanes comprising independently operable aileron and elevator actuating devices each having a driven member, a driving member mounted to selectively engage one of said driven members automatically upon tilting of the airplane out of a substantially horizontal plane of flight, a motor for actuating said driving member, electromagnetic means for retaining said motor and said driving member in effective driving position with respect to selected driven members, an automatic switch for controlling the electro magnetic means, and an automatic switch for controlling the motor.

5. Automatic control apparatus for airplanes comprising independently operable aileron and elevator actuating devices each having a driven member, a driving member mounted to selectively engage one of said driven members automatically upon tilting of the airplane out of a horizontal plane of flight, a manually operable control lever, a pendularly mounted motor for driving said driven members, and a motor switch on said control lever adapted to be held in open position when the operator grasps the lever and to move automatically to closed position when the operator releases said lever.

6. Automatic control apparatus for airplanes comprising independently operable aileron and elevator actuating devices each having a driven member, a driving member mounted to selectively engage one of said driven members automatically upon tilting of the airplane out of a horizontal plane of flight, a pendularly mounted motor for actuating said driving member, electro magnetic means for retaining said motor and said driving member in effective driving position in respect to selected driven members, a manually operable control lever, a motor switch on said control lever adapted to be held in open position when the operator grasps the lever and to move automatically to closed position when the operator releases said lever, and a second motor switch adapted to close the motor circuit after the motor is moved to effective driving position.

In testimony whereof, we have signed our names to this specification this 28th day of May, 1930.

GAIL BORDEN, 2ND.
ERIC CARLTON.